US007107403B2

(12) United States Patent
Modha et al.

(10) Patent No.: US 7,107,403 B2
(45) Date of Patent: Sep. 12, 2006

(54) SYSTEM AND METHOD FOR DYNAMICALLY ALLOCATING CACHE SPACE AMONG DIFFERENT WORKLOAD CLASSES THAT CAN HAVE DIFFERENT QUALITY OF SERVICE (QOS) REQUIREMENTS WHERE THE SYSTEM AND METHOD MAY MAINTAIN A HISTORY OF RECENTLY EVICTED PAGES FOR EACH CLASS AND MAY DETERMINE A FUTURE CACHE SIZE FOR THE CLASS BASED ON THE HISTORY AND THE QOS REQUIREMENTS (75) Inventors: Dharmendra Shantilal Modha, San Jose, CA (US); Divyesh Jadav, San Jose, CA (US); Pawan Goyal, San Jose, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 10/676,464

(22) Filed: Sep. 30, 2003

(65) Prior Publication Data
US 2005/0071599 A1  Mar. 31, 2005

(51) Int. Cl.
G06F 12/00 (2006.01)
G06F 13/00 (2006.01)

(52) U.S. Cl. .................. 711/129; 711/170; 711/133; 711/135; 709/226

(58) Field of Classification Search ................ 711/129, 711/170, 202, 133, 137, 171, 173; 709/219, 709/203, 226
See application file for complete search history.

(56) References Cited

U.S. PATENT DOCUMENTS 4,035,778 A * 7/1977 Ghanem ...................... 711/133
4,463,424 A   7/1984 Mattson et al.
4,503,501 A * 3/1985 Coulson et al. ............. 711/129
5,394,531 A   2/1995 Smith (Continued)

FOREIGN PATENT DOCUMENTS

JP   62-249253   12/1989

OTHER PUBLICATIONS

K. A. Bello et al., "Non-Volatile Cache Storage Allocation Algorithm," IBM Technical Bulletin, vol. 38, No. 12, Dec. 1995, pp. 39-42.

(Continued)

Primary Examiner—Hong Kim
(74) Attorney, Agent, or Firm—Khanh Q. Tran (57) ABSTRACT A method and system for dynamically allocating cache space in a storage system among multiple workload classes each having a unique set of quality-of-service (QoS) requirements. The invention dynamically adapts the space allocated to each class depending upon the observed response time for each class and the observed temporal locality in each class. The dynamic allocation is achieved by maintaining a history of recently evicted pages for each class, determining a future cache size for the class based on the history and the QoS requirements where the future cache size might be different than a current cache size for the class, determining whether the QoS requirements for the class are being met, and adjusting the future cache size to maximize the number of classes in which the QoS requirements are met. The future cache sizes are increased for the classes whose QoS requirements are not met while they are decreased for those whose QoS requirements are met.

30 Claims, 3 Drawing Sheets

U.S. PATENT DOCUMENTS

| | | | |
|---|---|---|---|
| 5,418,922 A * | 5/1995 | Liu ................................ 711/3 |
| 5,499,351 A | 3/1996 | Aschoff et al. |
| 5,499,354 A | 3/1996 | Aschoff et al. |
| 5,537,635 A | 7/1996 | Douglas |
| 5,627,994 A | 5/1997 | Levy et al. |
| 5,752,255 A * | 5/1998 | Jarvis ............................. 711/3 |
| 5,784,699 A * | 7/1998 | McMahon et al. .......... 711/171 |
| 6,052,822 A | 4/2000 | Kim et al. |
| 6,192,458 B1 | 2/2001 | Arimilli et al. |
| 6,256,747 B1 | 7/2001 | Inohara et al. |
| 6,493,800 B1 | 12/2002 | Blumrich |
| 6,745,295 B1 * | 6/2004 | Rodriguez ................... 711/136 |
| 6,766,418 B1 * | 7/2004 | Alexander et al. ........... 711/129 |
| 6,792,509 B1 * | 9/2004 | Rodriguez ................... 711/129 |
| 6,851,030 B1 * | 2/2005 | Tremaine .................... 711/160 |
| 6,865,647 B1 * | 3/2005 | Olarig et al. ................ 711/129 |
| 6,889,292 B1 * | 5/2005 | Alexander et al. .......... 711/129 |
| 2001/0001872 A1 | 5/2001 | Singh et al. |
| 2003/0065886 A1 * | 4/2003 | Olarig et al. ................ 711/129 |
| 2004/0230753 A1 * | 11/2004 | Amiri et al. ................. 711/147 |

OTHER PUBLICATIONS

Improving Disk Cache Hit-Raios Through Cache Partitioning, Dominique Thiebaut, Member IEEE, Harold S. Stone, Fellow iEE, and Joel L. Wolf.

* cited by examiner

SYSTEM AND METHOD FOR DYNAMICALLY ALLOCATING CACHE SPACE AMONG DIFFERENT WORKLOAD CLASSES THAT CAN HAVE DIFFERENT QUALITY OF SERVICE (QOS) REQUIREMENTS WHERE THE SYSTEM AND METHOD MAY MAINTAIN A HISTORY OF RECENTLY EVICTED PAGES FOR EACH CLASS AND MAY DETERMINE A FUTURE CACHE SIZE FOR THE CLASS BASED ON THE HISTORY AND THE QOS REQUIREMENTS

TECHNICAL FIELD

The invention relates to computer storage systems, and more particularly to a storage system and method for dynamically allocating space in a cache memory associated with the storage system among multiple workload classes that have different quality-of-service (QoS) requirements.

BACKGROUND OF THE INVENTION

Enterprises are increasingly out-sourcing the management of their data and applications to managed hosting services that collocate multiple sites, applications, and multiple customer types on the same host machine or a cluster and provide different quality-of-service (QoS) to them based on various pricing options. Due to the higher achievable utilization of resources and the benefits of centralized management, enterprises are also increasingly consolidating resources and sharing them across applications and users. Sharing and aggregation in storage subsystems is supported by network attached storage servers (NAS) and storage area networks (SAN) that allow access to storage devices from multiple servers.

One of the central challenges in shared environments is to manage resources such that applications and customers are isolated from each other and their performance can be guaranteed as in a dedicated environment. Numerous mechanisms for service differentiation and performance isolation have been proposed in the literature in the context of collocated web servers. Such mechanisms include QoS-aware extensions for admission control, TCP SYN oackets, policing and request classification, accept queue scheduling, and CPU, network, and disk bandwidth scheduling. However, the management of storage resources that takes into consideration workload classes having different QoS requirements has largely remained unaddressed.

The storage system in a shared hosting environment maybe a NAS server (supporting NFS/CIFS based network file access), a block server such as a SAN-based block virtualization engine, or an enterprise storage system such as IBM TotalStorage and EMC Symmetrix. To provide QoS in these storage systems, resources such as CPU and cache at the NAS and block servers, SAN network bandwidth, and disk bandwidth have to be managed. Techniques for allocating CPU, network, and disk bandwidth have been investigated in the literature for web servers and other applications and can potentially be applied to storage systems. However, techniques for allocating cache to provide QoS differentiation have not been adequately investigated and are the focus of this invention.

Caches differ fundamentally from other resources such as CPU and network bandwidth in two aspects. First, if CPU (or network bandwidth) is allocated to a workload class, it can be immediately used to improve the performance for that class. In contrast, the allocation of cache space does not yield immediate performance benefits for a workload class; performance benefits accrue in future only if there are cache hits. Furthermore, unlike a CPU, current cache space allocation for a class can significantly impact the future cache performance of all other classes. With ephemeral resources such as CPU and network bandwidth, adaptation is faster with immediate reallocation, while with cache allocation any adaptation technique requires a window into the future. Second, the performance benefit of cache space allocation depends on the workload characteristics of the class. More cache space does not necessarily imply better performance (e.g., if the workload has no hits). Due to these fundamental differences, techniques for meeting the quality-of-service (QoS) requirements of multiple classes that have been developed for resources such as CPU and network bandwidth cannot be directly applied to caches.

Figure 1:
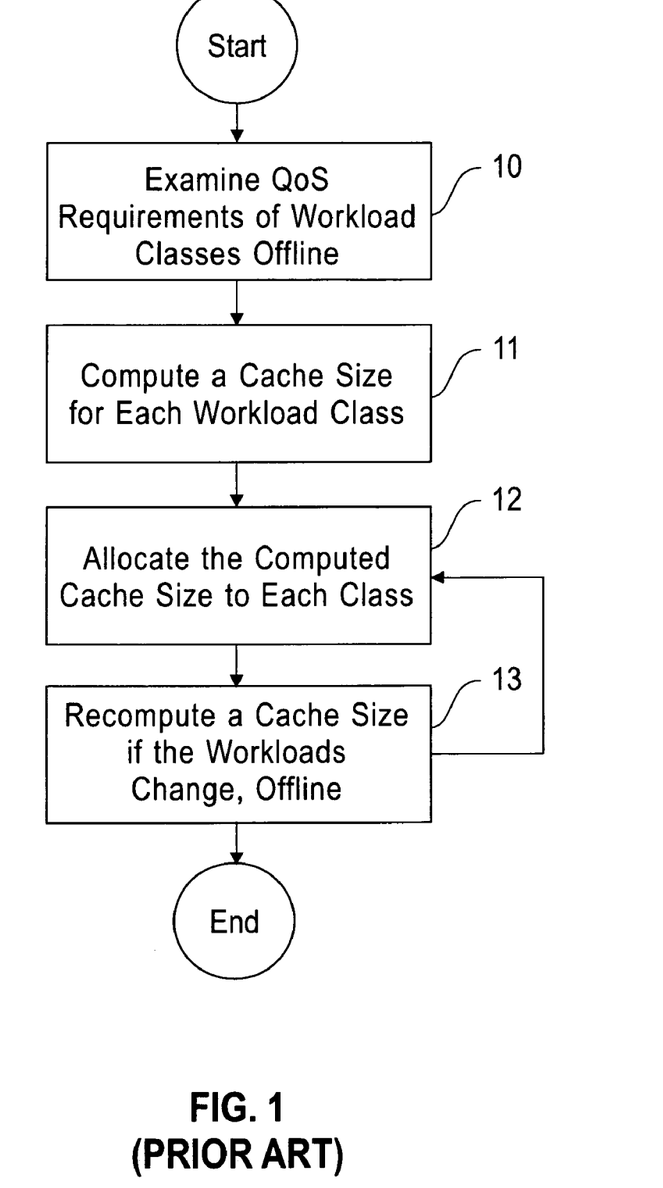
FIG. 1 is a flow chart showing a prior art method for statically allocating cache space among various workload classes in a storage system.

One approach for cache allocation is to statically partition the cache among different workload classes. FIG. 1 is a flow chart showing an example of prior art methods for statically allocating the cache. At step 10, the prior art method examines the QoS requirements of the workload classes offline. It then computes the cache size for each workload class based on its QoS requirements at step 11. At step 12, the method allocates the computed cache space to each workload class. As the workloads in a class change, the method would have to recompute the cache size offline at step 13 and allocate the cache space again at step 12. Such an approach in the prior art has two main drawbacks. First, due to the dynamic nature of the workload, it is difficult to determine the appropriate partition size apriori. Second, static partitioning leads to inefficient use of the cache. For example, if at some point in time, if one class has low locality and the other has high locality, then static allocation will underutilize the cache.

Therefore, there remains a need for a storage system and method for efficiently and dynamically allocating cache space among multiple classes of workloads in the system where each class has unique set of quality-of-service requirements to maximize system performance.

SUMMARY OF THE INVENTION

It is an object of the present invention to provide a method and system for dynamically allocating cache space among workload classes having different quality-of-service (QoS) requirements in storage system.

It is another object of the invention to provide a method and system for dynamically allocating the cache space among the various workload classes to maximize the number of classes in which the QoS requirements are met.

It is yet another object of the invention to provide a method and system for dynamically allocating the cache space among the various workload classes to satisfy a performance objective in the system.

To achieve these and other objects, the invention provides a method for dynamically partitioning a storage system cache among multiple workload classes having different quality-of-service (QoS) requirements where the cache holding data as data pages. The method comprising the steps of: (a) maintaining a history of recently evicted pages for each class; (b) determining a future cache size for the class based on the history and the QoS requirements, the future cache size being different than a current cache size for the class; (c) determining whether the QoS requirements for the class are being met; and (d) adjusting the future cache size to maximize the number of classes in which the QoS requirements are met. In one preferred embodiment, the future cache size for a class is adjusted periodically. In another preferred embodiment, the future cache size for a class is adjusted continuously on very request for data.

The history maintained for each class includes the pages (or buffers) that have recently been evicted from the cache for this class. The step of determining a future cache size includes: the steps of: recording cache hit data in the history of the class; recording the cache size corresponding to the cache hit data; and determining the future cache size based on the cache hit data and the respective cache sizes. The step of determining whether the QoS requirements for the class are being met includes the steps of: recording data concerning a QoS requirement for the class and comparing the recorded data with said QoS requirement. The step of adjusting the future cache size includes the steps of: increasing the future cache sizes of the classes whose QoS requirements are not met; and decreasing the future cache sizes of the classes whose QoS requirements are met. For a workload class in which the QoS requirements are met, its future cache size is a function of the current cache size and the difference between cache hit data and corresponding cache sizes. For a workload class in which the QoS requirements are not met, its future cache size is a function of the current cache size, the number of workload classes in the system and the difference between cache hit data and corresponding cache sizes. step of allocating the cache space to the classes to maximize the overall cache hits if the QoS requirements for all classes are met.

Additional objects and advantages of the present invention will be set forth in the description which follows, and in part will be obvious from the description and the accompanying drawing, or may be learned from the practice of this invention.

DESCRIPTION OF THE PREFERRED EMBODIMENTS

The invention will be described primarily as a computer storage system and method for dynamically allocating cache space among multiple workload classes having different quality-of-service (QoS) requirements. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the operations of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

The goals of a method of dynamically allocating cache space in a storage system are twofold: (a) QoS isolation and differentiation, and (b) performance maximization. The first goal is to allocate the cache space such that the storage system can provide desired QoS to the various classes. One may employ different QoS metrics such as throughput, response times, etc. The invention uses response time as the QoS metric. The response time goals for each class may be identical or different. In case the goals are identical, then cache allocation essentially isolates the performance of one class from the behavior of another class. The second goal is secondary to the QoS differentiation goal. The objective here is to allocate cache such that the cache system performance is maximized when all the QoS goals are met.

Caches might be deployed in a storage system at a local server file system, a NAS (network-attached storage) server, a block server such as a SAN-based in-band virtualization engine, or an enterprise storage system such as the IBM TotalStorage/EMC Symmetrix. The caches in such as system are managed in a similar way, using a cache replacement policy (primarily LRU) that has been modified to handle sequential accesses. The dynamic cache allocation method of the invention can be applied to caches at all the various components of the storage system. For the purposes of describing the invention, it is assumed that the cache is deployed at the SAN virtualization engine. The cache at the SAN virtualization engine is used for multiple purposes: for caching reads, prefetching data (read-ahead for sequential accesses), and implementing write-backs (i.e., acknowledging writes without actually writing to the disk). When a cache is used for write-backs, then it is either backed by battery, or it is non-volatile (NVRAM), or multiple copies of it are stored in different parts of the system that have independent failure modes. This is done to preserve the integrity of write data that appears to applications as if it has been "written", but is destaged to disk later in time.

There are two general approaches for implementing the cache: partitioned and unified. In the partitioned approach, the read and write caches are physically separate with the write cache being NVRAM. In the unified approach, the same cache is used for reads and writes and the integrity of writes is ensured using battery backed RAM or keeping multiple copies in caches with independent failure modes. With a unified cache, after the dirty write blocks are destaged to disk they are treated as part of the read cache. In this specification, the cache is assumed to be a unified cache while the blocks are continuously being destaged.

To provide differentiated QoS to the classes, the storage system has to be able identify the class to which an I/O request belongs. The specific classification depends on the storage protocol employed. In case of SCSI (either over Fiber Channel or IP protocol) which is the most widely deployed protocol in enterprises, the initiator address, target address, and logical-unit attributes of a request to do the classification. A class is identified by a set of initiator address, target address, and logical-units which can either be uniquely specified or include wildcards or ranges. The classification rules are stored in the storage system and can be populated using administrative interfaces or policy based storage management systems. The classification system classifies an I/O request on arrival as belonging to one of class. Associated with each class is a QoS specification. In general the specification can consist of multiple performance or availability requirements. We assume that the QoS requirement is that of average response time guarantees.

Cache allocation controls the response time by effecting the cache-hit ratio. The objective of the cache allocation is to allocate cache such that the measured average response time for a class is within defined bounds of the response time requirement for the class. If a QoS requirement is feasible, there may be multiple cache allocations that can satisfy the QoS requirements. If a given QoS requirement cannot be satisfied by any cache allocation, it is infeasible. The invention determines the utility that each class derives as a function of its response time and then chooses among the multiple feasible/infeasible allocations such that the overall utility is maximized. Though such a framework is conceptually elegant, it makes the cache allocation problem significantly hard. As a first step towards understanding QoS based cache allocation, the invention chooses a simpler objective of maximizing the overall cache hit ratio when multiple or none feasible cache allocations exists. Thus, the goals for cache allocation are: (1) meet the QoS requirements, and (2) maximize overall hit-ratio when QoS requirements have been met.

The invention provides two preferred embodiments for the method of dynamically allocating cache space: periodic allocation and continuous allocation. Both preferred embodiments manage the cache pages in each class using a Least-Recently-Used (LRU) principle, but either periodically or continuously control the length of the LRU list permitted for each class. In the preferred embodiment based on a periodic allocation, a cache partition size is readjusted periodically based on observed request arrival patterns and system state. In the preferred embodiment based on a continuous allocation, the cache allocation per class is dynamically adjusted on each request based on the current requirements and arrival patterns. Both preferred embodiments use a common feature, namely, they maintain a history of recently evicted buffers from the cache.

The invention enables a storage cache to meet the QoS requirements that class-unaware cache management methods such as LRU do not meet. If an offline-determined static partitioning of cache can meet the QoS requirements, then performance data show that the method of the invention also meets them and discovers the allocations online. In addition, the method of the invention has a larger feasibility region than offline static allocation methods. It not only meets the QoS requirements, but also optimizes the throughput by achieving a higher hit rate.

Figure 2:
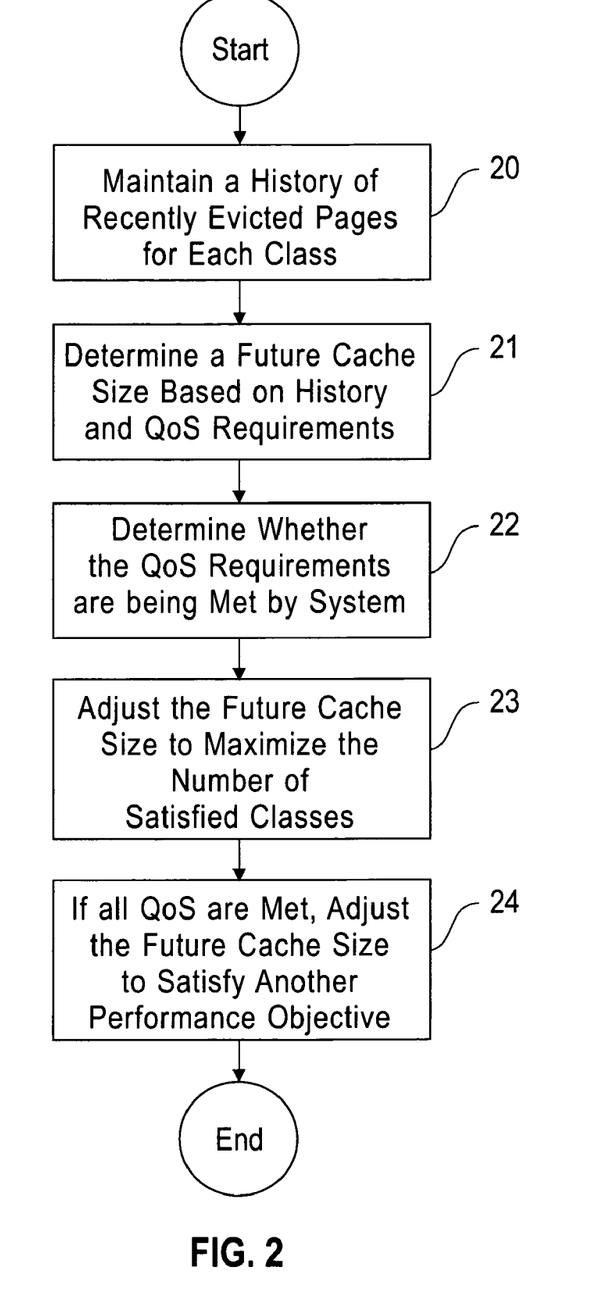
FIG. 2 is a flow chart showing a high-level process for dynamically allocating cache space for workload classes of different QoS requirements in accordance to with the invention.

FIG. 2 is a flow chart showing a high-level process for dynamically allocating the cache among the various workload classes according to the invention. At step 20, information concerning the recently evicted pages for each class is maintained in a history. At step 21, a future cache size, possibly different than the current cache size, is determined for the class based on the maintained history and the QoS requirements. At step 22, the invention determines whether the QoS requirements for this class are being met by the system. At step 23, the future cache size of the class is adjusted, smaller or larger, to maximize the number of classes in which the QoS requirements are met in the system. In addition, in the preferred embodiments of the invention, if the QoS requirements are being met for all classes, then the future cache size is adjusted at step 24 to satisfy another performance objective such as to maximize the number of classes which are as close to meeting their QoS requirements as possible.

Figure 3:
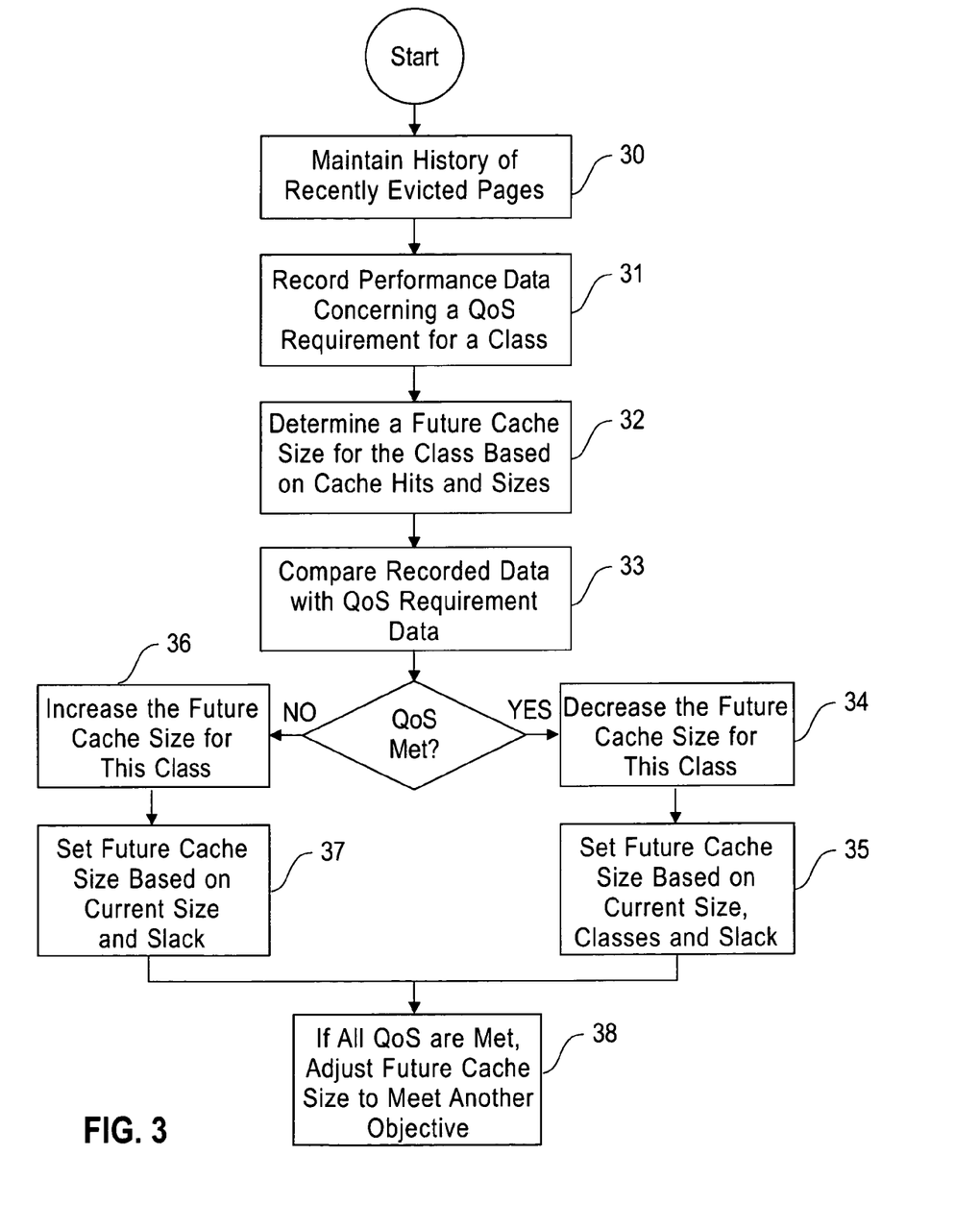
FIG. 3 is a flow chart showing the details of a preferred process for dynamically allocating cache space for workload classes of different QoS requirements in accordance to with the invention.

FIG. 3 is a flow chart showing details of the preferred embodiments of the invention for dynamically allocating the cache to the different workload classes. At step 30, a history of the recently evicted cache pages is maintained for each class. Two LRU lists are maintained for each class: the first list contains the pages currently in the cache. The second list contains the pages that have recently been evicted (the history). The method of the invention constantly adjusts the space allocated to each class and the size of the history lists maintained for each class. To accommodate such continuous cache space manipulation, the invention maintains the target sizes for these lists. The history lists are used to estimate the potential effectiveness of granting a certain class extra space. For example, if a class is performing a sequential scan, then its history list will show virtually no hits. As a result, the space allocated to that class will not be increased. Alternatively, if there is a class with extremely high temporal locality of reference, then its history list will also contain lots of hits, and, hence, the cache space allocated to that class is increased. The history lists constitute a space overhead and need to be minimized. On the other hand, if more history is maintained, then the hit rate functions associated with the various classes are more accurately estimated. Thus, a better cache reallocation is achieved. A constant amount of history might be allocated to each class. A history is allocated for a class that is proportional to the amount of cache space allocated to all other classes. Note that the targets are set for the history lists and not the sizes of the history lists themselves. For example, the space overhead of the history list consists of recording the logical block addresses and the logical unit IDs.

The two preferred embodiments of the invention, periodic allocation and continuous allocation, differ in how the target sizes for the cache lists are set. They also differ in how often these target sizes are updated, that is, periodically or continuously. The periodic allocation approach tries minimize the number of dissatisfied classes (those that have not met their QoS requirements) or tries to maximize the overall hit rate. To avoid the problem of selecting a fixed time interval for adaptation, it is triggered by the number of misses observed since the last adaptation cycle. The intuition is that if the arrival pattern changes the rate at which misses occur will also change accordingly. This is similar in concept to many caching systems that maintain a list of "free" buffers whose number when reduced below a "low-water-mark" triggers garbage collection. The free buffer list size is captured by the number of misses. As described above, a history list of previously evicted buffers is maintained for each class. For each class, there is an associated target value which represents the target cache size for that class based on the reallocation. When a reallocation is done, the cache space is not physically moved around by reassigning buffers, instead the target values are changed. The buffers are allocated on demand when a buffer is required on a miss. The basic rule is that classes whose actual sizes exceed their respective targets give up space to those classes whose actual sizes are less than their targets.

At step 31, data concerning a QoS requirement for a class is recorded in the history. Such data include the cache hits for the class and the cache sizes corresponding to the cache hits. At step 32, a future cache size for the class is determined based on the recorded cache hit and cache size data. At step 33, the recorded data is compared with the respective QoS requirement for that class to determine whether the QoS requirement for the class is being met by the storage system. If the QoS requirement for this workload class is being met by the system, then the cache space allocated to the class is decreased at step 34. The class' future cache size is set to a function of its current cache size, the number of workload classes in the system, and the difference between the cache hit data and corresponding cache sizes, at step 35. If the QoS requirement for this workload class is not being met by the system, then the cache space allocated to the class is increased at step 36. In this case, the future cache size is set to a function of the current cache size and the difference between cache hit data and corresponding cache sizes, as shown at step 37. If the QoS requirements for all classes are being met by the system, then the future cache size for each class is adjusted at step 38 to satisfy another performance criteria such as overall hit ratio. Further details on handling the buffers (cache pages) during the dynamic allocation of the cache are now described.

Hit processing: On a hit in a class, the location of the buffer is adjusted based on the LRU ordering and update the hit rate statistics of the class.

Miss processing: On a miss in a class, the cache size allocated to the class is checked to see if it is below a target value. If the cache size is above the target, the LRU buffer is moved to its history list and the new buffer is inserted into the class at the MRU location. In case the cache size is below the target, a second class needs to release a buffer. The second class is the one whose cache size is most above the target value. The second class releases a buffer and adds it to its history list. A new request of the first class is allocated the released buffer. The size of the history list is bounded such that the sum of the total history never exceeds the total cache size. In case the history list reaches its limit, we remove the LRU buffer from it.

Class ordering for re-allocation with QoS: At each adaptation interval, triggered by s misses (where s is a parameter), up to s buffers are reallocated among the different classes by adjusting the target values of the cache size. A class is classified as dissatisfied if the observed response time is larger than the QoS required response time. It is classified as satisfied when the reverse is true. Here, the difference between the QoS required response time and the observed response time is the slack in the response time. The higher the response time slack the more leeway is available for adjusting the resources allocated to it. The total amount of cache that a satisfied class can release depends on a slope.

Determining Slope: The class ordering requires determining the slope of the hit-rate versus cache-space curve. One way to predict the slope would be to record different hit rate values for the previously observed cache sizes and predict the future slope to be a linear combination of the previous slopes. Instead, we can get an accurate measure of what the hit rates would be for a larger cache size by recording the hits in the history list. The total hit rate (including cache and history) serves as a good estimate of what the hit rate would be when the cache size is increased to include the history list size. The ratio of the history hit rate to the history cache size is the slope of the hit-rate versus cache-size curve.

Reallocation with QoS: The next step in reallocation involves adjusting the target values of each class. The satisfied classes are ordered in descending order. Similarly, the dissatisfied classes are ordered in a descending order. In the simplest setup all the spare capacity from the class at the top of the satisfied set is moved to the one at the top of the dissatisfied class, working downwards.

The target value is bounded such that it never goes below 1 and never goes above the sum of the total cache size and history size. The lower bound ensures that a class should not get starved of all cache space. The upper bound is governed by implementation limitations. Since the slopes are determined based on the history list, any adjustment that sets the cache size to be larger than the sum of current cache size and the history size is working in a region where the values may not be representative.

Reallocation without QoS: When there is no QoS, or when no class can be satisfied or all classes are satisfied, the algorithm reverts to maximizing hit rates as its goal. The ordering of the requests is based on their hit rate density (i.e., the ratio of the hit rates to the cache size). This ordering maximizes the hit rates gain per unit cache size to maximize overall system performance. The ordering used in the QoS case using spare capacity does not apply in this case. All classes are arranged in descending order of their hit rate density. The s buffers are readjusted from the lowest order class to the highest order class in sequence by setting the targets appropriately. Similar to the QoS case we maintain the bounds on the target cache sizes.

Write Request The write requests are handled with a slight difference. First, a buffer used by write is marked dirty and is never a candidate for release as long as a clean buffer exists. When a write request is destaged it becomes clean and is treated as a read request. The destaging policy determines when the write requests are destaged to the disk and is beyond the scope of this paper. It is assumed that a write is immediately destaged by a continuous destager. Since buffering writes accrues immediate benefit the adaptation algorithm views it as a hit in the history list and a buffer is allocated to it similar to the procedure for a read miss.

The main drawback of the periodic allocation approach is to determine the value of s, the number of misses, that trigger the adaptation which in turn readjusts s buffers among the classes. The dynamic allocation approach continuously reallocates cache space amongst various classes so as to maximize the number of satisfied classes. This preferred embodiment has two nice properties: it has a constant-time implementation complexity per request and it does not require the notion of an adaptation interval. The hit and miss processing are similar to the periodic adaptation with some minor differences.

Hit processing: On a hit in a class, the hit buffer is moved to the MRU location of the list.

Miss processing: On a miss in a class, it finds another class that needs to release a buffer. This second class is the one whose cache size is most above the target value. If no such class is found or if the second class is satisfied, then the invention selects the requesting class to release a buffer. The class p that releases a buffer adds it to its history list. The new request of class is allocated the released buffer. The size of the history list is bounded such that the sum of the total history never exceeds the total cache size. In case the history list reaches its limit we remove the LRU buffer from it.

Target Adjustment: The idea of continuous allocation is to adjust the target cache sizes incrementally without requiring an explicit reordering. The target is increased when a class has a hit in its history list, i.e., it would have benefitted in case the cache size was larger. Since the target size is bounded by the total cache size the increase in class target should result in a corresponding decrease in the target value of another class. In this case the decrease is shared equally among the other classes. The increase in target is a ratio of the average history of the other classes to the history of the class with a hit. A class that has a hit in history will reduce its history size and correspondingly add to its cache size by the same proportion. In case a class is satisfied then it does not affect any target values and gets out of the adjustment game. The goal, when QoS is enforced, is to reduce the number of dissatisfied classes. The class that most quickly becomes satisfied stops aggressively acquiring space thus releasing space to other classes that can become satisfied, thereby, reducing their number. If all classes are satisfied then we revert back to maximizing the hit ratios and the target change is similar to the case when all were not satisfied.

Write Request: As with the periodic adaptation, the write request is viewed as a hit in the history list for target adjustment. A buffer is allocated to it as if it was a read miss.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for dynamically partitioning a storage system cache among multiple workload classes having different quality-of-service (QoS) requirements, the cache holding data as data pages, the method comprising the steps of:
   maintaining a history of recently evicted pages for each class;
   determining a future cache size for the class based on the history and the QoS requirements, the future cache size being different than a current cache size for the class;
   determining whether the QoS requirements for the class are being met; and
   adjusting the future cache size to maximize the number of classes in which the QoS requirements are met.

2. The method as recited in claim 1, wherein the step of determining whether the QoS requirements for the class are being met includes the steps of:
   recording data concerning a QoS requirement for the class; and
   comparing the recorded data with said QoS requirement.

3. The method as recited in claim 1, wherein the step of determining a future cache size includes the steps of:
   recording cache hit data in the history of the class;
   recording the cache size corresponding to the cache hit data; and
   determining the future cache size based on the cache hit data and the respective cache sizes.

4. The method as recited in claim 1, wherein the step of adjusting the future cache size includes the steps of:
   increasing the future cache sizes of the classes whose QoS requirements are not met; and
   decreasing the future cache sizes of the classes whose QoS requirements are met.

5. The method as recited in claim 4, wherein the step of increasing the future cache sizes includes the step of setting a future cache size as a function of current cache size and the difference between cache hit data and corresponding cache sizes.

6. The method as recited in claim 4, wherein the step of decreasing the future cache sizes includes the step of setting a future cache size as a function of the current cache size, the number of classes and the difference between cache hit data and corresponding cache sizes.

7. The method as in claim 1 further comprising the step of allocating the cache space to the classes to maximize the overall cache hits if the QoS requirements for all classes are met.

8. The method as recited in claim 1, wherein the future cache size is adjusted periodically.

9. The method as recited in claim 1, wherein the future cache size is adjusted continuously on very request for data.

10. The method as recited in claim 1, wherein the the future cache size is adjusted to maximized the total class objectives.

11. A storage system capable of dynamically partitioning a system cache among multiple workload classes having different quality-of-service (QoS) requirements, the cache holding data as data pages, the system comprising:
    means for maintaining a history of recently evicted pages for each class;
    means for determining a future cache size for the class based on the history and the QoS requirements, the future cache size being different than a current cache size for the class;
    means for determining whether the QoS requirements for the class are being met; and
    means for adjusting the future cache size to maximize the number of classes in which the QoS requirements are met.

12. The system as recited in claim 11, wherein the means for determining whether the QoS requirements for the class are being met includes:
    means for recording data concerning a QoS requirement for the class; and
    means for comparing the recorded data with said QoS requirement.

13. The system as recited in claim 11, wherein the means for determining a future cache size includes:
    means for recording cache hit data in the history of the class;
    means for recording the cache size corresponding to the cache hit data; and
    means for determining the future cache size based on the cache hit data and the respective cache sizes.

14. The system as recited in claim 11, wherein the means for adjusting the future cache size includes:
    means for increasing the future cache sizes of the classes whose QoS requirements are not met; and
    means for decreasing the future cache sizes of the classes whose QoS requirements are met.

15. The system as recited in claim 14, wherein the means for increasing the future cache sizes includes means for setting a future cache size as a function of the current cache size and the difference between cache hit data and corresponding cache sizes.

16. The system as recited in claim 14, wherein the means for decreasing the future cache sizes includes means for setting a future cache size as a function of the current cache size, the number of classes, and the difference between cache hit data and corresponding cache sizes.

17. The system as recited in claim 11 further comprising means for allocating the cache space to the classes to maximize the overall cache hits if the QoS requirements for all classes are met.

18. The system as recited in claim 11, wherein the future cache size is adjusted periodically.

19. The system as recited in claim 11, wherein the future cache size is adjusted continuously on very request for data.

20. The system as recited in claim 11, wherein the the future cache size is adjusted to maximized the total class objectives.

21. A computer-program product for use with a storage system for dynamically partitioning a system cache among multiple workload classes having different quality-of-service (QoS) requirements, the cache holding data as data pages, the computer-program product comprising:

a computer-readable medium including instructions that are executable by a computing device;

means, provided on the computer-readable medium, for maintaining a history of recently evicted pages for each class;

means, provided on the computer-readable medium, for determining a future cache size for the class based on the history and the QoS requirements, the future cache size being different than a current cache size for the class;

means, provided on the computer-readable medium, for determining whether the QoS requirements for the class are being met; and means, provided on the computer-readable medium, for adjusting the future cache size to maximize the number of classes in which the QoS requirements are met.

22. The computer-program product as recited in claim 21, wherein the means for determining whether the QoS requirements for the class are being met includes:

means, provided on the computer-readable medium, for recording data concerning a QoS requirement for the class; and means, provided on the computer-readable medium, for comparing the recorded data with said QoS requirement.

23. The computer-program product as recited in claim 21, wherein the means for determining a future cache size includes:

means, provided on the computer-readable medium, for recording cache hit data in the history of the class;

means, provided on the computer-readable medium, for recording the cache size corresponding to the cache hit data; and means, provided on the computer-readable medium, for determining the future cache size based on the cache hit data and the respective cache sizes.

24. The computer-program product as recited in claim 21, wherein the means for adjusting the future cache size includes:

means, provided on the computer-readable medium, for increasing the future cache sizes of the classes whose QoS requirements are not met; and means, provided on the computer-readable medium, for decreasing the future cache sizes of the classes whose QoS requirements are met.

25. The computer-program product as recited in claim 24, wherein the means for increasing the future cache sizes includes means, provided on the computer-readable medium, for setting a future cache size as a function of the current cache size and the difference between cache hit data and corresponding cache sizes.

26. The computer-program product as recited in claim 24, wherein the means for decreasing the future cache sizes includes means, provided on the computer-readable medium, for setting a future cache size as a function of the current cache size, the number of classes, and the difference between cache hit data and corresponding cache sizes.

27. The computer-program product as recited in claim 21 further comprising means, provided on the computer-readable medium, for allocating the cache space to the classes to maximize the overall cache hits if the QoS requirements for all classes are met.

28. The computer-program product as recited in claim 21, wherein the future cache size is adjusted periodically.

29. The computer-program product as recited in claim 21, wherein the future cache size is adjusted continuously on very request for data.

30. The computer-program product as recited in claim 18, wherein the future cache size is adjusted to maximized the total class objectives.

* * * * *